US011968084B2

(12) United States Patent
Lipstone et al.

(10) Patent No.: US 11,968,084 B2
(45) Date of Patent: Apr. 23, 2024

(54) SUBSCRIBER CONFIGURATION INGESTION IN A CONTENT DELIVERY NETWORK

(71) Applicant: Level 3 Communications, LLC, Broomfield, CO (US)

(72) Inventors: Laurence Lipstone, Calabasas, CA (US); Christopher Newton, Westlake Village, CA (US); William Crowder, Camarillo, CA (US); Vikas Dogra, Westlake Village, CA (US); Kevin Johns, Erie, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 18/117,164

(22) Filed: Mar. 3, 2023

(65) Prior Publication Data
US 2023/0208711 A1    Jun. 29, 2023

Related U.S. Application Data

(63) Continuation of application No. 15/961,686, filed on Apr. 24, 2018, now abandoned.

(51) Int. Cl.
*H04L 41/0813* (2022.01)
*H04L 67/10* (2022.01)
(52) U.S. Cl.
CPC ......... *H04L 41/0813* (2013.01); *H04L 67/10* (2013.01)
(58) Field of Classification Search
CPC .................. H04L 41/0813; H04L 67/10
See application file for complete search history.

(56) References Cited

U.S. PATENT DOCUMENTS

| 8,447,837 | B2 | 5/2013 | Devanneaux |
| 9,953,052 | B1 | 4/2018 | Hill |
| 10,177,909 | B1 | 1/2019 | Sullivan |
| 10,198,400 | B1 | 2/2019 | Farner |
| 2002/0188508 | A1 | 12/2002 | Lee |
| 2007/0156845 | A1 | 7/2007 | Devanneaux et al. |
| 2007/0250560 | A1* | 10/2007 | Wein ............... H04L 63/08 709/201 |
| 2008/0046596 | A1 | 2/2008 | Afergan |

(Continued)

OTHER PUBLICATIONS

European Examination Report, dated Jun. 28, 2022, Application No. 18743897.3, filed Jun. 22, 2018; 6 pgs.

(Continued)

*Primary Examiner* — Adnan M Mirza

(57) ABSTRACT

A method on a device in a content delivery (CD) network (CDN) that distributes content on behalf of one or more subscribers. In response to receiving configuration information from a subscriber, the configuration information relating to at least one property of the subscriber, generating subscriber-specific platform configuration information for the at least one property. Storing the subscriber-specific platform configuration information in platform configuration storage. Invalidating prior platform configuration information associated with the particular subscriber. Responsive to a request from a CDN component for platform configuration information associated with the particular subscriber: obtaining the subscriber-specific platform configuration information from the platform configuration storage; and providing the subscriber-specific platform configuration information to the CDN component.

14 Claims, 5 Drawing Sheets

(56) References Cited

U.S. PATENT DOCUMENTS

| | | | |
|---|---|---|---|
| 2013/0159473 A1* | 6/2013 | Newton | H04L 41/0856 |
| | | | 709/219 |
| 2013/0166423 A1 | 6/2013 | Beckert et al. | |
| 2014/0325590 A1* | 10/2014 | Lavi | H04L 63/0263 |
| | | | 726/1 |
| 2015/0046575 A1 | 2/2015 | Newton | |
| 2015/0074413 A1* | 3/2015 | Hao | G06F 21/10 |
| | | | 713/176 |
| 2015/0163097 A1 | 6/2015 | Lipstone et al. | |
| 2015/0207897 A1 | 7/2015 | Flack et al. | |
| 2015/0289203 A1 | 10/2015 | Zhang | |
| 2015/0326640 A1 | 11/2015 | Jellick | |
| 2017/0026441 A1* | 1/2017 | Moudy | G06F 9/5027 |
| 2017/0041424 A1 | 2/2017 | Conboy | |
| 2017/0048355 A1 | 2/2017 | Harish | |
| 2017/0171114 A1 | 6/2017 | Dao | |
| 2017/0244804 A1* | 8/2017 | Newton | H04L 67/02 |
| 2017/0264711 A1 | 9/2017 | Natarajan | |
| 2018/0192219 A1* | 7/2018 | Mehta | H04L 65/403 |
| 2019/0327140 A1 | 10/2019 | Lipstone | |

OTHER PUBLICATIONS

International Preliminary Report on Patentability, dated Nov. 5, 2020, Int'l Appl. No. PCT/US18/038991, Int'l Filing Date Jun. 22, 2018; 9 pgs.

International Search Report and Written Opinion of the International Searching Authority, dated Jan. 2, 2019, Int'l Appl. No. PCT/US18/038991, Int'l Filing Date Jun. 22, 2018; 14 pgs.

* cited by examiner

FIG. 4A

206
PLATFORM CONFIG. STORE — 400

| SUBSCRIBER CONFIGURATIONS | |
|---|---|
| SUBSCRIBER ID | SUBSCRIBER CONFIGURATION |
| 1 | CCS#1 |
| 2 | CCS#2 |
| ... | ... |
| N | CCS#N |

206
PLATFORM CONFIG. STORE — 402

| SUBSCRIBER/PROPERTY CONFIGURATIONS | | |
|---|---|---|
| SUBSCRIBER ID | PROPERTY | SUBSCRIBER CONFIGURATION |
| 1 | 1 | CCS#1,1 |
| 1 | 2 | CCS#1,2 |
| ... | ... | ... |
| N | 1 | CCS#N,1 |
| N | 2 | CCS#N,2 |

FIG. 4B

© Level 3 Communications, LLC. All Rights Reserved. Proprietary and Confidential until published as patent application or issued patent.

SUBSCRIBER CONFIGURATION INGESTION IN A CONTENT DELIVERY NETWORK

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to content delivery and content delivery networks. More specifically, to subscriber configuration in content delivery networks and systems, frameworks, devices and methods supporting subscriber configuration in content delivery and content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 4A-4B depict aspects of platform configuration storage according to exemplary embodiments hereof.

DETAILED DESCRIPTION OF THE PRESENTLY PREFERRED EXEMPLARY EMBODIMENTS

Glossary

As used herein, unless used otherwise, the following terms or abbreviations have the following meanings:

API means application program interface;
CCS means Customer Configuration Script;
CD means content delivery;
CDN means content delivery network;
DNS means domain name system;
GCO means Global Configuration Object; and
REST (or RESTful) means Representational State Transfer.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

DESCRIPTION

A content delivery network (CDN or CD network) distributes content (e.g., resources) efficiently to clients on behalf of one or more content providers (or subscribers), preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

Figure 1:
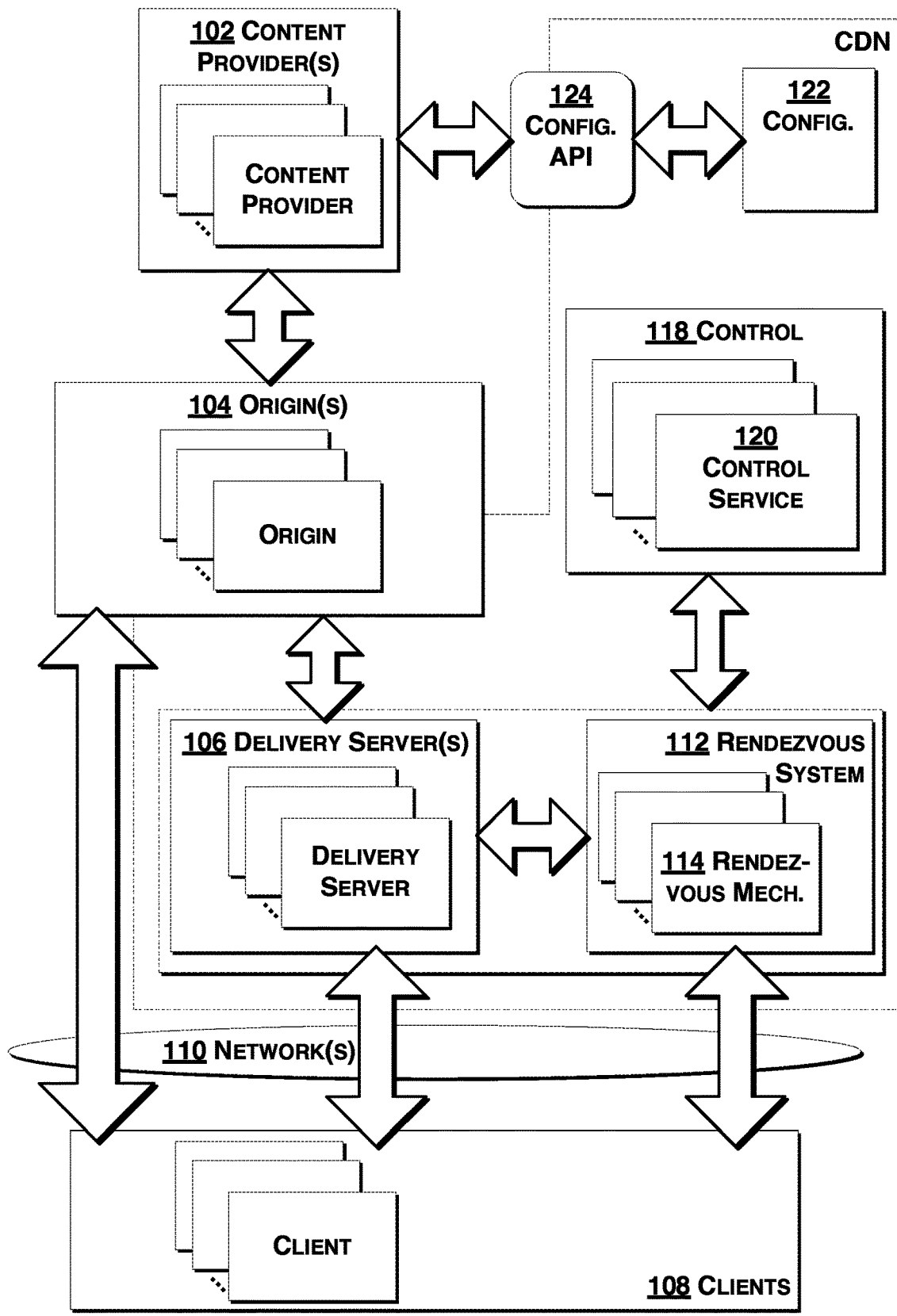
FIG. 1 depicts aspects of a content delivery network (CDN) according to exemplary embodiments hereof.

FIG. 1 shows aspects of an exemplary CDN in which one or more content providers (or subscribers) 102 provide content via one or more origin sources 104 and delivery services (servers) 106 to clients 108 via one or more networks 110. The delivery services (servers) 106 may form a delivery network from which clients 108 may obtain content. The delivery services 106 may be logically and/or physically organized hierarchically and may include edge caches. The delivery services 106 may be logically and/or physically organized into clusters.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Client requests (e.g., for content) may be associated with delivery server(s) 106 by a rendezvous system 112 comprising rendezvous mechanism(s) 114, possibly in the form of one or more rendezvous networks. The rendezvous mechanism(s) 114 may be implemented, at least in part, using or as part of a DNS system, and the association of a particular client request (e.g., for content) with one or more delivery servers may be done as part of DNS processing associated with that particular client request (e.g., of a domain name associated with the particular client request).

Typically, multiple delivery servers 106 in the CDN can process or handle any particular client request for content (e.g., for one or more resources). Preferably the rendezvous system 112 associates a particular client request with one or more "best" or "optimal" (or "least worst") delivery servers 106 to deal with that particular request. The "best" or "optimal" delivery server(s) 106 may be one(s) that is (are) close to the client (by some measure of network cost) and that is (are) not overloaded. Preferably the chosen delivery server(s) 106 (i.e., the delivery server(s) chosen by the rendezvous system 112 for a client request) can deliver the requested content to the client or can direct the client, somehow and in some manner, to somewhere where the client can try to obtain the requested content. A chosen delivery server 106 need not have the requested content at the time the request is made, even if that chosen delivery server 106 eventually serves the requested content to the requesting client.

When a client 108 makes a request for content, the client may be referred to as the requesting client, and the delivery server 106 that the rendezvous system 112 associates with that client request (and that the client first contacts to make the request) may be referred to as the "contact" server or just the contact.

Exemplary CDNs are described in U.S. Pat. Nos. 8,060,613 and 8,925,930.

The CDN may include a control system 118 (formed from the various control services 120). The control system 118 may be referred to as the control core or control mechanism. The control mechanism 118 may include two sides, namely a side dedicated to accepting and managing the configurations provided by CDN users (or subscribers), and a side dedicated to controlling endpoint services (such as caches) based on established configurations.

The CDN may have or provide default policies and procedures for delivery and/or handling of subscriber content. These system defaults may be specified and/or contained in one or more system configuration files or objects. In addition, content providers (or subscribers) 102 may customize aspects of delivery and/or handling of their content by the CDN. The subscriber customizations may be specified and/or contained in one or more subscriber configuration files or objects. The system default configuration may be augmented, supplemented, and/or replaced, at least in part, by subscriber configurations.

The control system 118 (e.g., control service(s) 120) may connect to/with delivery server(s) 106 and the rendezvous system 112. This is represented in the drawing in FIG. 1 by the arrow to/from the control system 118 to the combined set of 106 and 112. This arrow may represent, e.g., sending config information to the delivery service (e.g., CCS/GCO files) and/or to rendezvous system 112 (e.g., alias updates).

Configuration may be maintained, controlled, and administered, at least in part, by configuration mechanism 122. Subscribers may access the configuration mechanism 122 via an appropriate interface, e.g., via configuration API 124.

The configuration information may define, for a particular subscriber, for the subscriber's entire set of properties, how the CDN should handle those properties (e.g., how the CDN should service requests for that customer's properties). This may include, alias hostnames, origin servers from which to fill, and all policies associated with content associated with that subscriber. The system preferably maintains one subscriber configuration per subscriber (or per property per subscriber).

Figure 2:
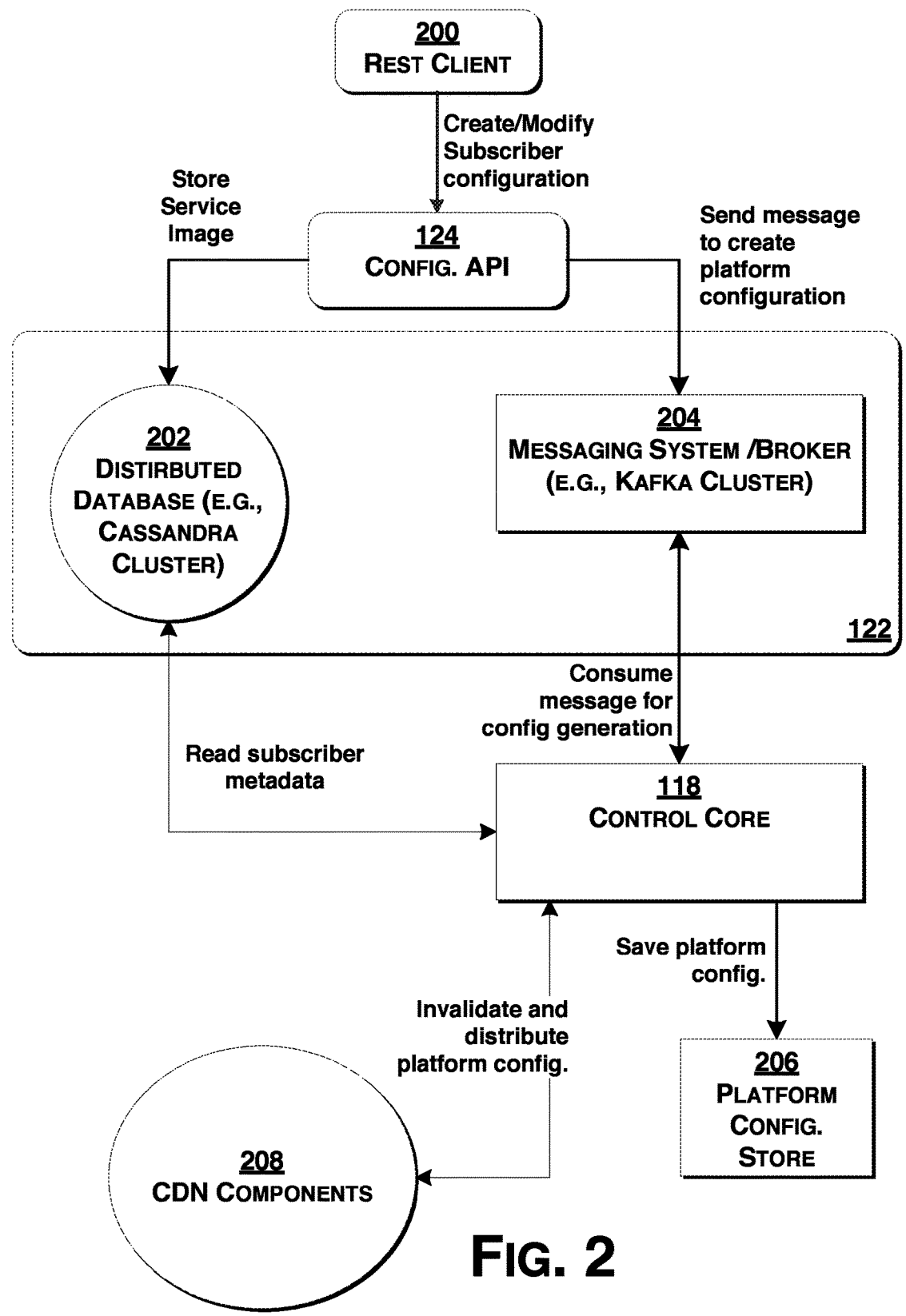
FIGS. 2 and 3 depict aspects of exemplary embodiments of real-time subscriber configuration ingestion according to exemplary embodiments hereof.
Figure 3:
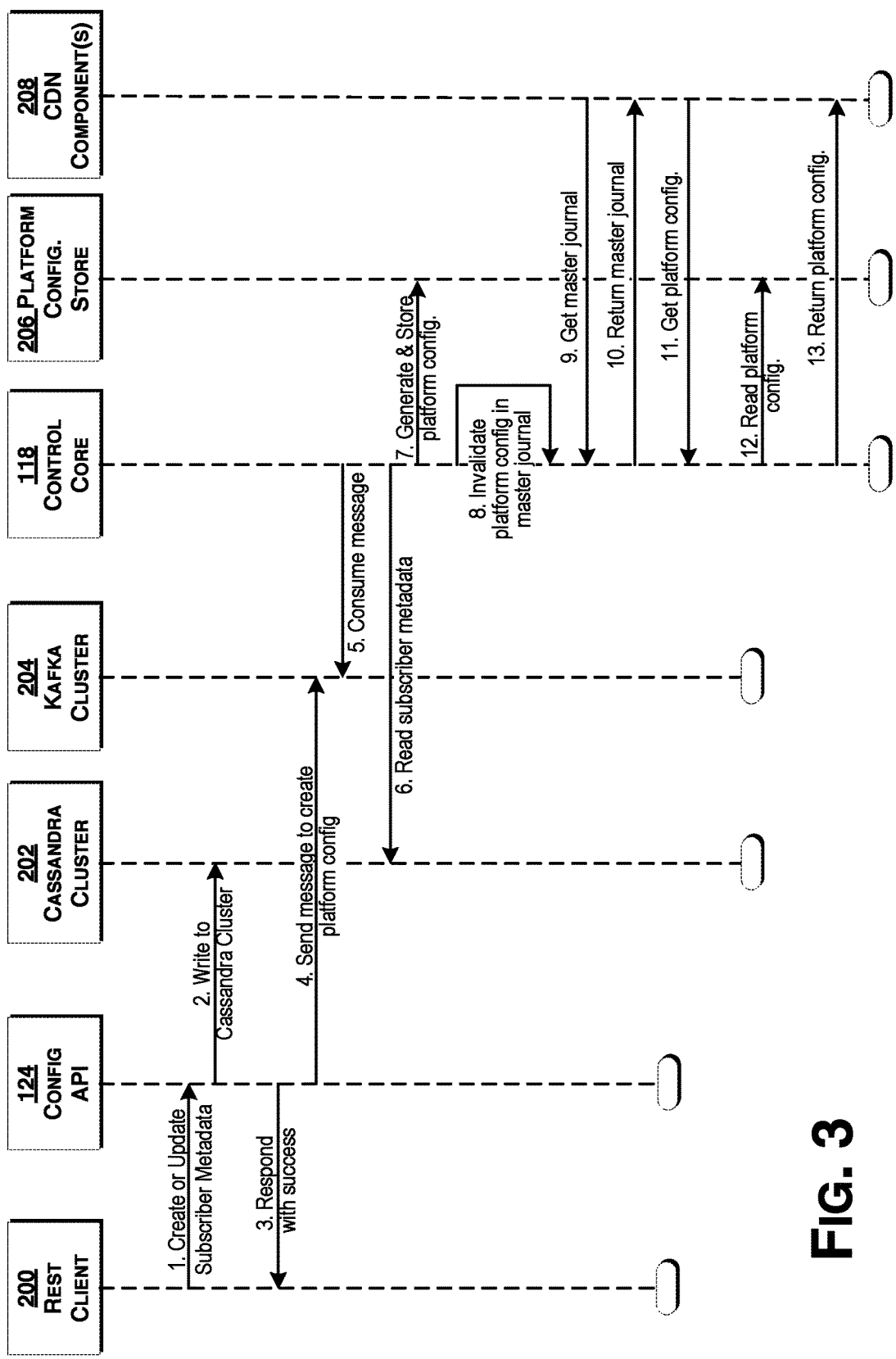

FIGS. 2 and 3 depict aspects of exemplary embodiments of real-time subscriber configuration ingestion according to exemplary embodiments hereof. As described here, subscriber configuration is modifiable directly by a subscriber or a subscriber's REST agent by invoking or calling the config API 124. The configuration modification is ingested into the network through a distributed set of applications and data stores.

With reference still to FIGS. 2 and 3, a subscriber invokes or calls the configuration API (or Config API) 124 (at 1 in FIG. 3) to create or modify the subscriber's configuration. Recall that the subscriber's configuration defines how the CDN deals with aspects of delivery and/or handling of that subscriber's content. The subscriber's configuration may augment or modify or replace aspects of the system default configuration.

The Config API 124 may be a RESTful API server for creating and modifying a subscriber's configuration. A REST client 200 that is authorized to access a subscriber configuration may read/modify/rollback the subscriber configuration.

The Config API 124 stores the subscriber's configuration in a distributed database cluster 202 (at 2 in FIG. 3). In a presently preferred embodiment, Cassandra is used for the distributed database 202. Cassandra provides a distributed database management system designed to handle large amounts of data across many commodity servers, providing high availability with no single point of failure. Cassandra may offer robust support for clusters spanning multiple datacenters, with asynchronous masterless replication allowing low latency operations for all clients. The Cassandra cluster may be a multi-node, multi-datacenter Cassandra cluster for storing subscriber configuration information. Those of ordinary skill in the art will appreciate and understand, upon reading this description, that different and/or other mechanisms may be used in place of the Cassandra cluster to implement aspects of embodiments hereof.

In Cassandra, writes and reads offer a tunable level of consistency. In preferred embodiments, writes to the Cassandra cluster 202 are preferably done with a consistency level of LOCAL_QUORUM so that when a read is done with a LOCAL_QUORUM, data is always consistent.

A response from the Config API 124 will indicate (at 3 in FIG. 3) whether or not the write to the cluster 202 was successful (e.g., providing "success" indication).

If the request was to create or update the subscriber's configuration, the config API 124 publishes a message (at 4 in FIG. 3) to a messaging system 204 (e.g., Kafka® cluster) for (or to cause) generation of platform configuration.

The messaging system 204 may be a multi-node Kafka® broker cluster that works as a high-throughput distributed messaging system.

Kafka® refers to Apache's distributed streaming platform, preferably with the following capabilities: Publish and subscribe to streams of records, similar to a message queue; Store streams of records in a fault-tolerant durable way; and process streams of records as they occur.

Those of ordinary skill in the art will appreciate and understand, upon reading this description, that different and/or other mechanisms may be used in place of the Kafka® to implement aspects of embodiments hereof.

Preferably the control core 118 consumes (or obtains) a message from the messaging system 204. As should be appreciated, it is important that no request made by the Config API 124 for platform config generation is lost (or missed) by control core 118, so that the platform configuration is always in sync with the config data configured by the subscriber.

Config API 124 publishes messages to the cluster 204 which are consumed by the Control Core 118.

The control core 118 preferably monitors the messaging system 204 and consumes messages for the control core 118. In particular, the control core 118 consumes messages (at 5 in FIG. 3) from a cluster of messaging system 204 for generating platform configurations for a subscriber.

While reading subscriber configuration information from the Cassandra cluster 202 (at 6 in FIG. 3), a consistency level of LOCAL_QUORUM should ensure that there is no data loss and that the control core 118 gets the latest copy of the subscriber's data.

After consuming a message (at 5 in FIG. 3), the control core 118 reads subscriber configuration data/information (e.g., subscriber metadata) (at 6 in FIG. 3) from the Cassandra cluster 202 and then generates and stores platform configurations (at 7 in FIG. 3).

The generated platform configurations are based, at least in part, on the subscriber configuration information read from the Cassandra cluster 202. The generated platform configurations are preferably also based on default and/or system-wide configurations and on CDN policies. As should be appreciated, while subscribers may be able to create and/or modify configurations, such configurations should comply with CDN policies. The generated platform configuration contains the newly modified changes in platform aware language.

The control core 118 stores configuration data (e.g., platform configuration data) in a data store 206 and invalidates the prior configuration data (at 7 and 8 in FIG. 3). In order to invalidate prior configuration(s), the control core 118 may issue invalidation instructions to the network for configurations to be replaced by the newly generated platform configuration(s). While invalidation of control objects is the presently preferred approach, those of ordinary skill in the art will appreciate and understand, upon reading this description, that different and/or other approaches may be used. For example, the CDN may poll for changes to such objects.

As noted above, the system preferably maintains one subscriber configuration per subscriber (or per property per subscriber). The platform configuration store 206 maintains the subscriber configurations for the CDN's subscribers.

The control core 118 may provide an interface (e.g., a REST API) for delivering the platform configurations to the CDN nodes.

CDN components 208 (e.g., CDN delivery servers 106, etc.) monitor the control core 118 for changes in the master journal (indicating potentially invalid content). Accordingly, in response to the control core 118 invalidating the platform config in the master journal (at 8 in FIG. 3), each CDN component (e.g., CDN delivery servers 106, etc.) gets the updated master journal from the control core 118 (at 9 and 10 in FIG. 3). The CDN component(s) then request the new/modified platform configuration from the control core 118 (at 11 in FIG. 3).

The control core 118 reads the platform configuration from the platform configuration storage (data store 206) (at 12 in FIG. 3), and then returns the platform configuration to the requesting CDN component (at 13 in FIG. 3).

A CDN component receiving configuration information may use that information as is or it may process the configuration information into local configuration information based, e.g., on the capabilities of the CDN component.

As should be appreciated, a CDN component (e.g., a CDN delivery server 106) may use the subscriber-provided configuration information to perform subscriber-specific handling (e.g., subscriber-specific request/response processing).

The configuration information in a subscriber's configuration may define, for the subscriber's entire set of properties, how the CDN should handle those properties (e.g., how the CDN should service requests for that customer's properties). This may include, alias hostnames, origin servers from which to fill, and all policies associated with content associated with that subscriber. The system maintains one subscriber configuration per subscriber (or per property per subscriber).

Each subscriber has its own configuration information (which may be default). That is, the system maintains a single subscriber configuration for each subscriber, and that subscriber configuration defines all configuration details for all of that subscriber's content. As should be appreciated, the current approach (with a single configuration per subscriber) allows a subscriber to handle most or all content the same way, with differences expressed incrementally for that content to be handled differently. An alternate approach is to have a CCS per resource or for smaller groups of resources of a subscriber, but this alternate approach misses the commonality that most subscribers use for most of their resources.

In some exemplary implementations, the subscriber-specific configuration information may be specified in so-called Customer Configuration Scripts (CCSs). Customer-specific scripts may be used to process a customer's requests (i.e., requests for or associated with a subscriber's content), and may be associated with the customers/subscribers, e.g., via customer/subscriber identifiers.

FIG. 4A depicts aspects of platform configuration storage 206 according to exemplary embodiments hereof. As shown, the platform configuration storage 206 may include subscriber configurations 400, indexed by subscriber identifier. Thus, e.g., subscriber j has subscriber configuration CCS #j, and so on. In some cases, the system may include a default subscriber configuration for each subscriber, to be used unless/until the configuration is modified.

If a subscriber has multiple properties with different configurations for different properties, then that subscriber may be allocated a different subscriber id for each property, or the data structure 402 shown in FIG. 4B may be used.

A data structure (e.g., a Global Configuration Object or GCO) may be used to determine whether a request is associated with a CDN subscriber (and therefore, e.g., whether a requested resource can be served). A GCO may include information that will allow a CDN component (e.g., a cache server) to determine whether a requested resource corresponds to a resource of a subscriber (or customer) of the CDN (or to a CDN resource). Essentially the CDN component may use the GCO to determine whether a resource belongs to a property configured to use the CDN. Since the GCO is a global control resource, common to all agents, (whereas other control resources (e.g., CCSs) are generally downloaded on demand), the GCO should be succinct.

Configuration Model Implementation

Match Rules

An exemplary implementation of the customer (subscriber) configuration model uses a so-called "match rules" approach. Within a configuration there is the option of having rules or mappings. The match rules effectively act as mappings or lookup tables. An exemplary implementation of the match rules is described here. As should be appreciated, configurations may use approaches other than match rules, and match rules may be implemented differently.

The exemplary match-rule model is table-driven. This has the advantage of readability, e.g., when setting a set of options slightly differently across a large number of aliases.

A basic Match Rule has the following format:

```
'"ID" : ' <numeric label>
['"Followed-by" : ' ("break" | "jump-to" <ID>)]
[ '"Expr" : ' <expression>]
['"MatchSet" : ' <MatchSet>]
['"MatchSetOrder" : ' ( "first"|"last")]
<flagName> ':' <flagValue> {',' <flagName> ':'
<flagValue>}*
```

Each Match Rule may have a Match Rule ID that can be used to order rules and to provide jump targets.

Each Match Rule may be part of a Match Rule Group. A Match Rule Group is a collection of Match Rules, with first-match-wins semantics. The subscriber configuration has at least one collection of Match Rule Groups. In some cases two such collections may be used, one for processing on receipt of the request and the second for processing on the receipt of the response. The two-collection configuration may only be needed at nodes, generally referred to as parent nodes, that contact the origin server.

Each Match Rule Group may be processed in a specified order (e.g., driven off of the numeric Match Rule Group ID in ascending order)—when a match is found, the processing associated with that match is performed, and by default processing then jumps to the start of the next Match Rule Group. Processing can jump to a distinct Match Rule, or processing can be halted (break) using the Followed-by element. If no Followed-by is specified, processing moves to the first element of the next Match Rule Group (if present).

An exemplary Match Rule Group may look like:

```
"Match Rule Group ID" : <numeric label>
"Match Rules" :
  {
    <Match Rule>
  },
  {
    <Match Rule>
  },
  ...
``` and the total collection may look like:

```
"Match Rule Collection" : ("request"|"response")
"Match Rule Groups" :
  {
    "Match Rule Group ID" : <numeric label>
    "Match Rules" :
    {
      <Match Rule>
    },
    {
      <Match Rule>
    },
    ...
  }
```

Each Match Rule may specify one or more actions (e.g., setting cache expiration, cache key manipulation, content/header processing modes, etc.) directly. An action may involve setting one or more flags.

If a collection of Match Rules wants to set the same set of flags to the same set of values, then rather than repeating them within a series of Match Rules, the flag setting can be encapsulated within a Match Set. This is essentially the same as a Match Rule Group, but one that is not processed within the normal flow of processing; rather it is 'called by reference' when named within an executed Match Rule. If both a Match Set and explicitflagNames are provided within a single Match Rule, the Match Set is run first and then the explicitflagNames. This order can be altered via the optional MatchSetOrder which can specify that the MatchSet is either run first (the default), or last (i.e., after the explicit flagNames).

In order for a Match Rule to be matched, the expression has to evaluate to true in the Expr: element. If no 'Expr' is specified, it implicitly evaluates to true, and hence such a Match Rule is always said to match when reached. Matching means that the specified flag settings (explicit as well as via any MatchSet) are made, and processing for this Match Rule Group completes. Processing by default moves to the start of the next Match Rule Group, unless a Followed-by is specified in which case processing either completes completely (on break) or jumps to the Match Rule with a given ID (on jump-to <ID>).

Operators within the expression (all operators may be inverted by prepending "!"; for convenience, "!=" is a synonym for "!==") are:
== Equality test
%= Equality test (case insensitive)
*= Glob test
%*= Glob test (case insensitive)
= Set match (match against list of strings or expressions)
%#= Set match (case insensitive)
&& Logical AND
|| Logical OR
( ) Grouping The following variables are available in a present implementation:

Request-Related Variables:

| | |
|---|---|
| $req.<name> | Request header <name>. |
| $uri | URI of request (as received). |
| $full_uri | Full URI of request (derived). |
| $scheme | Scheme. |
| $authority | Authority. |
| $user | User portion of authority. |
| $password | Password portion of authority. |
| $host | Host (usually the same as $req.host). |
| $port | Port of request |
| $path | Request path (no query string). |
| $pathquery | Request path (with query string, equivalent to $path$queryq). |
| $query | Query string. |
| $queryq | Query string with leading "?". |
| $fragment | Fragment. |
| $client_ip | Effective client IP address. |
| $hop_ip | IP address of previous hop. |

Response-Related Variables:

| | |
|---|---|
| $resp.<name> | Response header <name>. |
| $status | Response HTTP status. |

Other Variables

| | |
|---|---|
| $var.<name> | A variable set on the request by an earlier rule. |
| $cfgvar.<name> | Local configuration variable. |
| $map[<N>].<name> | Result of Nth (starting from 0) map, counting from left to right in expression. "$map" is the same as "$map0". <name> selects the value from the map. See 'Maps' below. |

Transforms:

An extended syntax for variables allows named transforms to be applied.

For example:
${<name>[:<xfrm>[(<args>)][ . . . ]]}
or
${"<string>"[:<xfrm>[(<args>)][ . . . ]]}
${'<string>'[:<xfrm>[(<args>)][ . . . ]]}

Some transforms include:

| | |
|---|---|
| base64encode | Base 64 encode |
| base64decode | Base 64 decode |
| urlencode(<arg>) | URL encode (arg decides "+" handling) |
| urldecode(<arg>) | and decode |
| hash(<args>) | Cryptographic hash, as defined by the arguments, which might include the type of hash, the secret or a reference to a secret, etc. |

-continued

| | |
|---|---|
| rex(<args>) | Search/replace using rex. |
| lowercase(<arg>) | convert any text in the presented string to lower case |
| uppercase(<arg>) | convert any text in the presented string to upper case |
| pselect(<p>, <s> [,<ns>]) | The pselect transform takes two or three arguments: a percentage value <p> (a floating point number), a string <s>, and an optional string <ns>. It evaluates to the string <s> <p> percent of the time, else, <ns> or an empty string if <ns> is not provided. The <s> and <ns> strings are themselves subject to interpolation. |

Transforms are applied in the order given.

In some embodiments it may be possible to set fields in rules to the value of an interpolated string.

The pselect transform (with arguments (<p>, <s>[,<ns>])) may be used, e.g., to distribute requests differently (e.g., to locations specified by string "s" or by string "ns") based on the value of p. This may be used, e.g., to move a specified percentage of a library to a different server, in a consistent fashion, in the cases where the server normally responsible for the content is reporting that it is overloaded.

Maps

The expression syntax may also allow for a reference to a Map of data. These can be considered function calls; they return a Boolean value which is true when a match is found within the map and are able to set additional values that can then be referenced by name from the calling layer—the names of these 'returned' values are part of the definition of the map.

The map( ) call takes a list of one or more map names, and a string value to be passed into each as the key to be looked up. This string (key) argument may be a simple value (e.g., $host) or the result of an expression—in particular, it may be the result of another map lookup. The map( ) call returns a Boolean. An alternate valuemap( ) call returns the actual value list from the matched entry.

There are several types of maps:

regular maps which perform exact lookups of the presented key and as such can be implemented as a direct key lookup, e.g., hashtable (discrete);

glob maps where the keys listed are shell glob patterns;

regexp maps (same as glob maps, except a regular expression is used instead of a glob);

int-range maps where the key is interpreted as an integer on entry into the map, and where the key can be a single integer or integer range (<lo>-<hi>)—if the provided key string is not interpretable as an integer, the key looked up will be a NaN value; and ip-range maps which are similar to integer (int-range) maps, except that the key string is interpreted as an IP address (range)—this preferably supports both IPv4 and IPv6 (using any of the standard formats) and ranges can be specified as <lo>-<hi> or <addr>/<maskbits>.

A glob map or regexp map needs to be searched entry by entry until a match is found. As usual, a first-match-wins approach is taken. Since ranges could overlap (either with other ranges or with discrete values), the smallest range (or lowest value of <lo>) wins.

This gives:

```
'"MatchMap" :'
    '"Name" : ' <match map name>
    ['"ValueNames" : ' <name>[, <name>]*]
    ['"MatchType" : ' ("discrete"|"glob"|"ip-
        range"|"int-range")]
    ['"DefaultValue" : ' ("error("<errText>")" |
        <valueSpec>)]
    '"Data" :'
        '{' <keySpec> ',' <valueSpec> '}'
        ...
    keySpec :== '"Key" : ' <key> | '"Keys" : { '
        <key> {',' <key>}+ '}'
    valueSpec :== '"Value" : ' <value> |
    '"Values" : {' <value> {',' <value>}* '}' |
    '"valuemap"(' <mapNameList> ',' <arg> ' )'
```

The list of names specified in the ValueNames attribute are the names that can then be used in the $map[$N].<name> variable in the calling context. Such names are only available in the direct caller.

The list of values need not be the same length in each row of a given table; any 'missing' values are set to null/undef in the calling context, and are assumed to be the relevant number of trailing elements of any ValueNames list. null/undef can be placed within the values list to 'skip' unneeded entries.

Finally, the 'DefaultValue' provides an option to return a set of values on any call that does not match a keySpec. Note that this means that this MatchMap will always match.

EXAMPLES

As a first example, consider a desire to set some authentication modes for particular paths on a couple of properties. In match rules, this ends up being (assuming the alias for ID X is id<X>.com):

```
1.  "expr" : "$host" == "id12.com" && "$path" *= "/image/*"
    "token" : {
        "id" = <appropriate id>,
        "action" = "error",
    }
2.  "expr" : "$host" == "id12.com" && "$path" *= "/doc/*"
    "geo" : {
        "idlist" = "US",
        "type" = "whitelist",
        "action" = "error",
    }
3.  "expr" : "$host" == "id22.com"
    "token" : {
        "id" = <appropriate_id>,
        "action" = "redirect",
        "url" = "/sorry",
    }
4.  "expr" : true
    "token" : {
        "id" = <appropriate_id>,
        "action" = "error",
    }
```

This example has only four simple rules and there is only one redundant test (the second test of host against "id12.com"). However, those of ordinary skill in the art will realize and appreciate, upon reading this description, that this approach would be useful in an extended case (e.g., with 100 aliases, 90 of which shared the same authentication requirements as "id123.com" and the other 10 of which need what "id12.com" has). One way to implement the extended example would be to utilize MatchSets:

```
"MatchSet" : {
    "Name": "auth1"
    "MatchRule": {
        "Expr": "$path" *= "/image/*"
        "Token": {
            "id" = <tokenID>
            "Action" = "error"
        }
    }
    "MatchRule" : {
        "Expr" : "$path" *= "/doc/*"
        "Geo" : {
            "id" = <geoID>
            "Type" = "whitelist"
            "Action" = "error"
        }
    }
}
"MatchSet" : {
    "Name" : "auth2"
    "MatchRule" :
    "Expr": "true"
    "Token" : {
        "id" = <tokenID>
        "Action" = "redirect"
        "URL" = "/sorry"
    }
}
"MatchSet" : {
    "Name" : "auth3"
    "MatchRule" : {
        "Expr" : "$path" *= "/secure/*"
        "Token" : {
            "id" = <tokenID>
            "Action" = "error"
        }
    }
}
```

We may then have a map like:

```
"MatchMap" :
    "Name" : "MatchSetsByAlias"
    "ValueNames" : "MatchSetNames"
    "DefaultValue" : "auth3"
    "Data" :
    {
        "Key" : "starwars.com"
        "Values" : { "auth1, auth3" }
    },
    {
        "Key" : "alien.com"
        "Values" : { "auth1, auth3" }
    },
    {
        "Key" : "bladerunner.com"
        "Values" : { "auth1, auth3" }
    },
    ...
    {
        "Key" : "marypoppins.com"
        "Values" : { "auth2, auth3" }
    },
    {
        "Key" : "musicman.com"
        "Values" : { "auth2, auth3" }
    },
    {
        "Key" : "myfairlady.com"
        "Values" : { "auth2, auth3" }
    }
}
```

And finally a rule:

```
"MatchRule" :
    "ID" : 1
    "Expr" : "map"("MatchSetsByAlias", "$host")
    "MatchSet" : "$map.MatchSetNames"
```

Here, the map operator matches the given value in the given map. If the map has a default value, or if there's a match in the map, the result is true and the rule is executed. As a side effect, it also makes available the pseudo-variable $map, from which values from the map can be selected using ".<ValueName>".

This concept of named match sets (i.e., reusable sets of rules which can be referenced by name) can be efficiently extended to apply to a large number of aliases.

An issue with the above is constant repetition of "auth1, auth3" or "auth2, auth3" in the map, which leads to:

```
"MatchMap" :
    "Name" : "MatchSetsByAlias"
    "ValueNames" : "MatchSetNames"
    "DefaultValue" : "auth3"
    "Data" :
    {
        "Keys" : { "starwars.com", "alien.com",
                   "bladerunner.com", <...> },
        "Values" : { "auth1, auth3" }
    },
    {
        "Keys" : { "marypoppins.com",
                   "musicman.com",
                   "myfairlady.com", <...> },
        "Values" : { "auth2, auth3" }
    }
}
```

This concept may be further extended to allow matching of multiple maps in a single "map" call. For example, to add a host ID to the above, we have:

```
"MatchMap" :
    "Name" : "IDsByAlias"
    "ValueNames" : "ID"
    "DefaultValue" : error("Missing alias!")
    "Data" :
    { "Key" : "starwars.com",        "Value" : "11"
    }
    { "Key" : "alien.com",           "Value" : "10"
    }
    { "Key" : "bladerunner.com",     "Value" : "9"
    }
    { "Key" : "marypoppins.com",     "Value" : "12"
    }
    { "Key" : "musicman.com",        "Value" : "13"
    }
    { "Key" : "myfairlady.com",      "Value" : "14"
    }
    ...
"MatchRule" :
    "ID: 1
    "Expr" : "map"("IDSByAlias",
        "MatchSetsByAlias", "$host")
    "HostID" : "$map1.ID"
    "MatchSet" : "$map2.MatchSetNames"
```

A Query String Handling mode (QSHMode) may be used to extend the MatchMap syntax and semantics. In this example, the rules (not in matchrule/matchmap syntax) are as follows (where the default is "off"):

| | | |
|---|---|---|
| starwars.com | | |
| | * | on |
| alien.com | | |
| | /nostromo/* | on |
| bladerunner.com | | |
| | /pkdick-bio/* | on |
| | /images/* | on |
| musicman.com | | |
| | /mwilson-bio/* | on |
| | /images/* | on |
| myfairlady.com | | |
| | /cockney-primer/* | on |

Note that "marypoppins.com," is left out of the rules because, in this example, none of the paths associated with that property require QSHMode.

MatchMap may be extended as follows:

```
"MatchMap" :
    "Name" : "StarWarsQSH"
    "ValueNames" : "enabled"
    "DefaultValue" : "true"
"MatchMap" :
    "Name": "AlienQSH"
    "DefaultValue" : "false"
    "ValueNames" : "enabled"
    "MapType" : "glob"
    "Data" :
    {
        "Key" : "/nostromo/*",
        "Value" : "true"
    }
"MatchMap" :
    "Name" : "BladeRunnerQSH"
    "DefaultValue" : "false"
    "ValueNames" : "enabled"
    "MapType" : "glob"
    "Data" :
    {
        "Key" : "/pkdick-bio/*",
        "Value" : "true"
    },
    {
        "Key" : "/images/*",
        "Value" : "true"
    }
"MatchMap" :
    "Name" : "MusicManQSH"
    "DefaultValue" : "false"
    "ValueNames" : "enabled"
    "MapType" : "glob"
    "Data" :
    {
        "Key" : "/mwilson-bio/*",
        "Value" : "true"
    },
    {
        "Key" : "/images/*",
        "Value" : "true"
    }
"MatchMap" :
    "Name" : "MyFairLadyQSH"
    "DefaultValue" : "false"
    "ValueNames" : "enabled"
    "MapType" : "glob"
    "Data" :
    {
        "Key" : "/cockney-primer/*",
        "Value" : "true"
    }
```

This provides the overall QSHMode map for this property:

```
"MatchMap" :
    "Name" : "QSHModeByAlias"
    "DefaultValue" : "false"
    "Data" :
    { "Key" : "starwars.com",
      "ValueMap" : { "StarWarsQSH", "$path" }
    },
    { "Key" : "alien.com",
      "ValueMap" : { "AlienQSH", "$path" }
    },
    { "Key" : "bladerunner.com",
      "ValueMap" : { "BladeRunnerQSH", "$path" }
    },
    { "Key" : "musicman.com",
      "ValueMap" : { "MusicManQSH", "$path" } },
    { "Key" : "myfairlady.com",
      "ValueMap" : { "MyFairLadyQSH", "$path" }
    }
```

So the rule for this property is now:

```
"MatchRule" :
    "ID" : 1
    "Expr" : "map"("IDSByAlias",
        "MatchSetsByAlias",
        "QSHModeByAlias", "$host")
    "HostID" : "$map1.ID"
    "MatchSet" : "$map2.MatchSetNames"
    "QSHMOde" : "$map3.enabled"
```

This can be equivalently written:

```
"MatchRule" :
    "ID" : 1
    "HostID" : "map"("IDSByAlias", "$host")".ID"
    "MatchSet" : "map"("MatchSetsByAlias",
        "$host")".MatchSetNames"
    "QSHMOde" : "map"( "QSHModeByAlias",
        "$host")".enabled"
```

Real Time

Those of ordinary skill in the art will realize and understand, upon reading this description, that, as used herein, the term "real time" means near real time or sufficiently real time. It should be appreciated that there are inherent delays built in to the CDN (e.g., based on network traffic and distances), and these delays may cause delays in data reaching various components. Inherent delays in the system do not change the real-time nature of the data. In some cases, the term "real-time data" may refer to data obtained in sufficient time to make the data useful in providing feedback.

Although the term "real time" has been used here, it should be appreciated that the system is not limited by this term or by how much time is actually taken for data to have an effect on control information. In some cases, real time computation may refer to an online computation, i.e., a computation that produces its answer(s) as data arrive, and generally keeps up with continuously arriving data. The term "online" computation is compared to an "offline" or "batch" computation.

Computing

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 5:
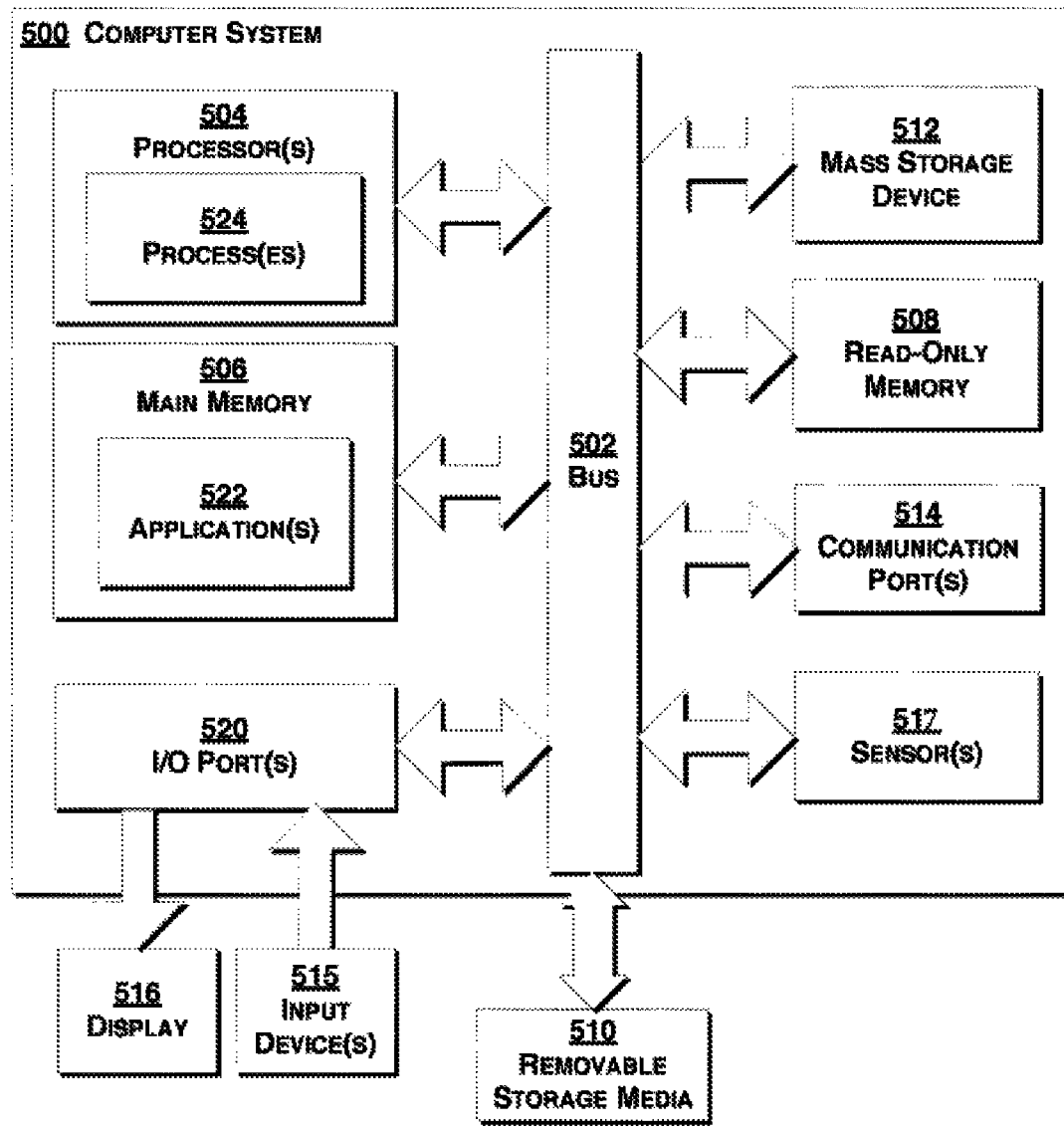
FIG. 5 depicts aspects of computing according to exemplary embodiments hereof.

FIG. 5 is a schematic diagram of a computer system 500 upon which embodiments of the present disclosure may be implemented and carried out.

According to the present example, the computer system 500 may include a bus 502 (i.e., interconnect), one or more processors 504, a main memory 506, read-only memory 508, removable storage media 510, mass storage 512, and one or more communications ports 514. As should be appreciated, components such as removable storage media are optional and are not necessary in all systems. Communication port 514 may be connected to one or more networks by way of which the computer system 500 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be any known processor, such as, but not limited to, an Intel® Itanium® or Itanium 2® processor(s), AMD® Opteron® or Athlon MP® processor(s), or Motorola® lines of processors, and the like. Communications port(s) 514 can be any of an RS-232 port for use with a modem based dial-up connection, a 10/100 Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520.

Main memory 506 can be Random Access Memory (RAM), or any other dynamic storage device(s) commonly known in the art. Read-only memory 508 can be any static storage device(s) such as Programmable Read-Only Memory (PROM) chips for storing static information such as instructions for processor 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage, and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 506 is encoded with application(s) 522 that supports the functionality discussed herein (the application 522 may be an application that provides some or all of the functionality of the CD services described herein, including the client application). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret or otherwise perform the logic instructions of the application(s) 522. Execution of application(s) 522 produces processing functionality of the service related to the application(s). In other words, the process(es) 524 represent one or more portions of the application(s) 522 performing within or upon the processor(s) 504 in the computer system 500.

It should be noted that, in addition to the process(es) 524 that carries (carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508 and/or mass storage device 512.

Those skilled in the art will understand that the computer system 500 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Discussion

Thus are described systems, methods, and devices supporting subscriber configuration ingestion in a content delivery network.

As described, when a subscriber makes a change to their configuration, that change will be ingested into the CDN in real time.

Those of ordinary skill in the art will appreciate and understand, upon reading this description, that embodiments hereof distribute risk, and that the distributed and highly scalable design guarantees high-availability, no data lose and "near real-time" distribution and consumption of changes into the CDN network.

CONCLUSION

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", or (i), (ii), . . . , and the like) are used to help distinguish and/or identify, and not to show any serial or numerical limitation or ordering.

While various embodiments have been described herein, other manners are contemplated.

As used in this description, the term "portion" means some or all. So, for example, "A portion of X" may include some of "X" or all of "X". In the context of a conversation, the term "portion" means some or all of the conversation.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" ("e.g.,") and the like, is merely intended to better illustrate the invention and does not indicate a limitation on the scope of the invention unless specifically so claimed.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method operable on at least one device in a content delivery network (CDN), wherein the CDN distributes content on behalf of one or more subscribers, the method comprising:
    receiving configuration information from a particular subscriber of the one or more subscribers, the configuration information relating to at least one property of the particular subscriber, wherein the particular subscriber is a content provider;
    in response to the receiving, generating subscriber-specific platform configuration information for the at least one property of the particular subscriber;
    storing the subscriber-specific platform configuration information in platform configuration storage;
    receiving, by at least one CDN component, a request for the at least one property of the particular subscriber, wherein the at least one CDN component comprises a delivery server;
    receiving, by the delivery server, the subscriber-specific platform configuration information, wherein the subscriber-specific platform configuration information includes at least a first match rule group, containing at least a first match rule having a first match rule identifier (ID) and a second match rule have a second match rule ID, and a second match rule group, containing at least a third match rule having a third match rule ID and a fourth match rule having a fourth match rule ID;
    processing the subscriber-specific platform configuration information by processing the first match rule group until a first match is found for the first match rule and then jumping to the third match rule of the second match rule group and processing the second match rule group until a second match is found; and
    causing the at least one property of the particular subscriber to be delivered according to the processed subscriber-specific platform configuration information, wherein the first match rule and the third match rule both reference at least a first match set identifier,
    wherein a first match set corresponding to the first match set identifier comprises at least a fifth match rule and a sixth match rule,
    wherein the subscriber-specific platform configuration information further includes a first map of the configuration data,
    wherein the first map of the configuration data includes a map name and at least one value equal to the match set identifier, and
    wherein the processing further includes processing a first map function call to the map name and a key value identifying the at least one property.

2. The method of claim 1, wherein the processing of the subscriber-specific platform configuration information comprises processing the first match set as part of processing each of the first match rule and the third match rule.

3. The method of claim 1, wherein the first map function call further calls a second map of the configuration data.

4. The method of claim 1, wherein the first match rule group is part of a first collection of match rule groups used by the delivery server upon receipt of the request for the at least one property, and the second match rule group is part of a second collection of match rule groups used by the delivery server upon receipt of response from an origin server.

5. The method of claim 1, wherein the subscriber-specific configuration information includes identification of at least one server to serve the at least one property, wherein at least the first match rule comprises a transform, and wherein the transform is used to vary the identification of the at least one server to provide the at least one property.

6. A system in a content delivery network (CDN), wherein the CDN distributes content on behalf of one or more subscribers, the system comprising:
    at least one processor;
    memory, operatively connected to the at least one processor and storing instructions that, when executed by the at least one processor, cause the system to perform a method, the method comprising:
        receiving configuration information from a particular subscriber of the one or more subscribers, the configuration information relating to at least one property of the particular subscriber, wherein the particular subscriber is a content provider;
        in response to the receiving, generating subscriber-specific platform configuration information for the at least one property of the particular subscriber;
        storing the subscriber-specific platform configuration information in platform configuration storage;
        receiving, by at least one CDN component, a request for the at least one property of the particular subscriber, wherein the at least one CDN component comprises a delivery server;
        receiving, by the delivery server, the subscriber-specific platform configuration information, wherein the subscriber-specific platform configuration information includes at least a first match rule group, containing at least a first match rule having a first match rule identifier (ID) and a second match rule have a second match rule ID, and a second match rule group, containing at least a third match rule having a third match rule ID and a fourth match rule having a fourth match rule ID;
        processing the subscriber-specific platform configuration information by processing the first match rule group until a first match is found for the first match rule and then jumping to the third match rule of the second match rule group and processing the second match rule group until a second match is found; and
        causing the at least one property of the particular subscriber to be delivered according to the processed subscriber-specific platform configuration information,
    wherein the first match rule and the third match rule both reference at least a first match set identifier,
    wherein a first match set corresponding to the first match set identifier comprises at least a fifth match rule and a sixth match rule,
    wherein the subscriber-specific platform configuration information further includes a first map of the configuration data,
    wherein the first map of the configuration data includes a map name and at least one value equal to the match set identifier, and wherein the processing further includes processing a first map function call to the map name and a key value identifying the at least one property.

7. The system of claim 6, wherein the processing of the subscriber-specific platform configuration information comprises processing the first match set as part of processing each of the first match rule and the third match rule.

8. The system of claim 6, wherein the first map function call further calls a second map of the configuration data.

9. The system of claim 6, wherein the first match rule group is part of a first collection of match rule groups used by the delivery server upon receipt of the request for the at least one property, and the second match rule group is part of a second collection of match rule groups used by the delivery server upon receipt of response from an origin server.

10. The system of claim 6, wherein the subscriber-specific configuration information includes identification of at least one server to serve the at least one property, wherein at least the first match rule comprises a transform, and wherein the transform is used to vary the identification of the at least one server to provide the at least one property.

11. A nontransitory computer readable medium, storing instructions that, when executed by at least one processor, cause the at least one processor to perform a method, the method comprising:
  receiving configuration information from a particular subscriber of the one or more subscribers, the configuration information relating to at least one property of the particular subscriber, wherein the particular subscriber is a content provider;
  in response to the receiving, generating subscriber-specific platform configuration information for the at least one property of the particular subscriber;
  storing the subscriber-specific platform configuration information in platform configuration storage;
  receiving, by at least one CDN component, a request for the at least one property of the particular subscriber, wherein the at least one CDN component comprises a delivery server;
  receiving, by the delivery server, the subscriber-specific platform configuration information, wherein the subscriber-specific platform configuration information includes at least a first match rule group, containing at least a first match rule having a first match rule identifier (ID) and a second match rule have a second match rule ID, and a second match rule group, containing at least a third match rule having a third match rule ID and a fourth match rule having a fourth match rule ID;
  processing the subscriber-specific platform configuration information by processing the first match rule group until a first match is found for the first match rule and then jumping to the third match rule of the second match rule group and processing the second match rule group until a second match is found; and
  causing the at least one property of the particular subscriber to be delivered according to the processed subscriber-specific platform configuration information,
  wherein the first match rule and the third match rule both reference at least a first match set identifier,
  wherein a first match set corresponding to the first match set identifier comprises at least a fifth match rule and a sixth match rule,
  wherein the subscriber-specific platform configuration information further includes a first map of the configuration data,
  wherein the first map of the configuration data includes a map name and at least one value equal to the match set identifier, and
  wherein the processing further includes processing a first map function call to the map name and a key value identifying the at least one property.

12. The nontransitory computer readable medium of claim 11, wherein the processing of the subscriber-specific platform configuration information comprises processing the first match set as part of processing each of the first match rule and the third match rule.

13. The nontransitory computer readable medium of claim 11, wherein the first match rule group is part of a first collection of match rule groups used by the delivery server upon receipt of the request for the at least one property, and the second match rule group is part of a second collection of match rule groups used by the delivery server upon receipt of response from an origin server.

14. The nontransitory computer readable medium of claim 11, wherein the subscriber-specific configuration information includes identification of at least one server to serve the at least one property, wherein at least the first match rule comprises a transform, and wherein the transform is used to vary the identification of the at least one server to provide the at least one property.

\* \* \* \* \*